United States Patent
Dilts et al.

(10) Patent No.: US 10,336,546 B2
(45) Date of Patent: Jul. 2, 2019

(54) WINDROW CHUTE WITH INDEPENDENTLY MOVABLE CHUTE SECTIONS

(71) Applicant: CNH Industrial America LLC, New Holland, PA (US)

(72) Inventors: Mark D. Dilts, New Holland, PA (US); Nathan E. Issac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/709,705

(22) Filed: Sep. 20, 2017

(65) Prior Publication Data

US 2019/0084764 A1 Mar. 21, 2019

(51) Int. Cl.
*B65G 11/12* (2006.01)
*A01D 41/12* (2006.01)

(52) U.S. Cl.
CPC ........ *B65G 11/126* (2013.01); *A01D 41/1243* (2013.01); *B65G 2201/04* (2013.01); *B65G 2812/083* (2013.01)

(58) Field of Classification Search
CPC .............. B65G 43/08; B65G 2814/027; B65G 69/0441; B65G 47/19; B65G 11/083; A01D 43/087
USPC ...................................... 193/22, 23
See application file for complete search history.

(56) References Cited

U.S. PATENT DOCUMENTS

| | | | |
|---|---|---|---|
| 3,683,602 A | 8/1972 | Scarnato et al. | |
| 6,591,972 B1 * | 7/2003 | Forrest ............... | B65G 69/0441 193/23 |
| 6,939,221 B1 | 9/2005 | Redekop et al. | |
| 7,559,833 B2 | 7/2009 | Isaac et al. | |
| 2014/0096498 A1 | 4/2014 | Estock et al. | |
| 2016/0135370 A1 | 5/2016 | Farley et al. | |
| 2016/0316623 A1 | 11/2016 | Reinecke et al. | |
| 2017/0112055 A1 | 4/2017 | Depreitere et al. | |

FOREIGN PATENT DOCUMENTS

| | | |
|---|---|---|
| DE | 202014102621 U1 | 6/2015 |
| WO | 2004112457 A1 | 12/2004 |

OTHER PUBLICATIONS

European Search Report for EP Application No. 18194920.7 dated Jan. 23, 2019 (5 pages).

* cited by examiner

*Primary Examiner* — Gene O Crawford
*Assistant Examiner* — Lester Rushin, III
(74) *Attorney, Agent, or Firm* — Patrick M. Sheldrake; Peter K. Zacharias

(57) ABSTRACT

A windrow chute assembly includes a plurality of movable chute sections. A first chute section has a first proximal end for receiving material, and a first distal end opposite the first proximal end. The second chute section has a second proximal end for receiving material, and a second distal end opposite the second proximal end. The first and second proximal ends define a transverse axis therebetween. The first and second chute sections are displaceable toward one another to a closed or partially closed configuration to control the width and placement of each windrow. The first and second chute sections are also displaceable away from one another to an open configuration to provide access to rear areas of the combine.

19 Claims, 12 Drawing Sheets

WINDROW CHUTE WITH INDEPENDENTLY MOVABLE CHUTE SECTIONS

FIELD

The present disclosure relates generally to residue handling systems in agricultural harvesters, and more particularly to a windrow chute with independently movable sections that can be adjusted to different positions during operation of a harvester to control the placement and spacing of windrows.

BACKGROUND

An agricultural vehicle known as a harvester "combine" can perform multiple harvesting functions, including picking, threshing, separating and cleaning of grain. A combine includes a header which removes the crop from a field, and a feeder housing which transports the crop matter into the combine for further processing. During this processing, grain is separated from crop residue. The crop residue, such as straw, is discharged from the rear of the combine. In many cases, the crop residue is deposited back onto the field in the form of windrows at the back of the combine. The windrows can then be collected by balers or other machinery, after which the collected material can be fed to livestock or used for other purposes.

Windrow material is typically discharged through a chute at the rear of the combine and deposited on the field. The material is often deposited in a generally straight line along the center line of the combine, or in close proximity to the center line. Given the width of the combine, the resulting windrows are spaced relatively far apart from one another. This is not always desirable, because many balers can only collect one windrow per pass when the windrows are spaced far apart.

It is desirable to reduce the velocity of windrow material as it exits the combine. A high discharge velocity can drive the windrow material below the stubble that remains on the field, making collection of the material difficult. Reducing the velocity of the discharged material can create a more fluffy windrow that rests on top of the stubble. For this reason, some combines are provided with relatively long windrow chutes to control the discharge velocity. While longer chutes can reduce discharge velocity of crop residue and create very narrow fluffy windrows, they have the disadvantage of occupying a large amount of space on the rear of the combine, making it difficult to reach the engine access ladder and other areas on the rear of the combine above the chute.

It is also desirable to control the width of the windrow (i.e. the cross dimension of the windrow perpendicular to the direction of movement of the combine). There are instances when wider windrows are desired, and instances when narrower windrows are desired. Wider windrows allow crop residue with a higher moisture content to dry more quickly on the field, because the crop residue is deposited in a thinner layer and spread over more area. On the other hand, if the crop residue is already dry, then a narrower windrow may be more desirable so that the material can be easily picked up with a baler without having to first rake the material into narrower rows. Unfortunately, many conventional windrow chutes lack the ability to adjust the width of windrows because the chutes have fixed geometries.

It is further desirable to control the trajectory of material through the windrow chute as the combine reaches the end of each pass. At the end of each pass, the combine will might execute a 180 degree turn to begin the next pass in the opposite direction. During the turn, crop residue continues to discharge from the windrow chute. The windrow chute may briefly accelerate as the rear end of the combine executes the turn, causing crop residue to exit the chute at a higher velocity, spread out over a wide swath, form an irregularly-shaped path, and/or penetrate below the stubble. These conditions can make it more difficult to collect the crop residue at the end of the windrow.

It is still further desirable to control the position of windrows so that they do not interfere with other equipment during a harvest. For example, it can be desirable to have a tractor and grain cart drive parallel to the combine along the combine's prior travel tracks during a harvest to collect grain from the combine. This process is difficult when windrows are being deposited onto the field along the centerline of the combine. In such cases, the tractor and grain cart must drive over or "straddle" the windrows as they drive alongside the combine. The tractor and/or grain cart may not have adequate ground clearance to straddle the windrows, however. In such a case, the bottom of the tractor and/or grain cart can disrupt the windrows and drag the material. This can make it impractical to collect grain in grain carts during harvesting when windrowing is used.

The foregoing drawbacks and challenges illustrate the need for an improved apparatus and method for depositing crop residue in windrows.

SUMMARY

The drawbacks of conventional windrow chutes are addressed in many respects by windrow chutes in accordance with the invention.

According to one embodiment, a windrow chute assembly for an agricultural vehicle can include a chute body comprising a plurality of movable chute sections. The plurality of movable chute sections can include a first chute section and a second chute section. The first chute section can have a first proximal end for receiving material from the agricultural vehicle, a first distal end opposite the first proximal end for discharging material from the agricultural vehicle, and a first chute axis extending between the first proximal end and the first distal end. The second chute section can have a second proximal end for receiving material from the agricultural vehicle, a second distal end opposite the second proximal end for discharging material from the agricultural vehicle, and a second chute axis extending between the second proximal end and the second distal end. The first proximal end of the first chute section and the second proximal end of the second chute section can define a transverse axis therebetween. The first chute section can be displaceable so as to define a first angle of displacement between the first chute axis and the transverse axis, and the second chute section can be displaceable so as to define a second angle of displacement between the second chute axis and the transverse axis. The first chute section and the second chute section can be displaceable toward one another to a closed configuration, in which a sum of the first angle of displacement and the second angle of displacement is a maximum, and displaceable away from one another to an open configuration, in which the sum of the first angle of displacement and the second angle of displacement is a minimum.

In another embodiment, the first chute section can be pivotally mountable on a first pivot axis, and the second chute section can be pivotally mountable on a second pivot axis offset from the first pivot axis.

In another embodiment, the first pivot axis can be parallel to the second pivot axis.

In another embodiment, the first pivot axis and the second pivot axis can be perpendicular to the transverse axis.

In another embodiment, the first pivot axis and the second pivot axis can be vertical axes.

In another embodiment, the first chute section can be displaceable through an angle greater than ninety degrees relative to the transverse axis, and the second chute section can be displaceable through an angle greater than ninety degrees relative to the transverse axis.

In another embodiment, the sum of the first angle of displacement and the second angle of displacement can be 180 degrees when the first chute section and the second chute section are in the closed configuration.

In another embodiment, the sum of the first angle of displacement and the second angle of displacement can be less than 0 degrees when the first chute section and the second chute section are in the open configuration.

In another embodiment, the windrow chute assembly can define a center axis that extends perpendicularly to the transverse axis at a point equidistant from the first proximal end of the first chute section and the second proximal end of the second chute section.

In another embodiment, the first chute section and the second chute section can each be pivotable toward the center axis to assume a zero position.

In another embodiment, the first chute axis can be parallel to the second chute axis in the zero position.

In another embodiment, the first chute axis can intersect the second chute axis in the closed configuration.

In another embodiment, the first chute section and the second chute section can be movable to the closed configuration at a zero position in which the first chute axis and the second chute axis are parallel to the center axis.

In another embodiment, the first chute section and the second chute section can be movable to the closed configuration at a left bias position in which the first angle of displacement is less than ninety degrees and the second angle of displacement is greater than ninety degrees.

In another embodiment, the first chute section and the second chute section can be movable to the closed configuration at a right bias position in which the first angle of displacement is greater than ninety degrees and the second angle of displacement is less than ninety degrees.

In another embodiment, the first chute section can include a first bottom wall section and the second chute section can include a second bottom wall section, the first bottom wall section and the second bottom wall section configured to convey material out of the first chute section and the second chute section, respectively.

In another embodiment, the first chute section can include a first sidewall and the second chute section can include a second sidewall.

In another embodiment, the first bottom wall section can overlap the second bottom wall section in the closed configuration.

In another embodiment, the first chute section and the second chute section can form an open channel in the closed configuration.

In another embodiment, the first chute section and the second chute section can form a closed conduit in the closed configuration.

BRIEF DESCRIPTION OF THE DRAWINGS

For the purpose of illustration, there are shown in the drawings certain embodiments. It should be understood, however, that embodiments of the invention are not limited to the precise components, arrangements, dimensions, and instruments shown. Like numerals generally indicate like elements throughout the drawings. In the drawings.

DETAILED DESCRIPTION

Figure 1:
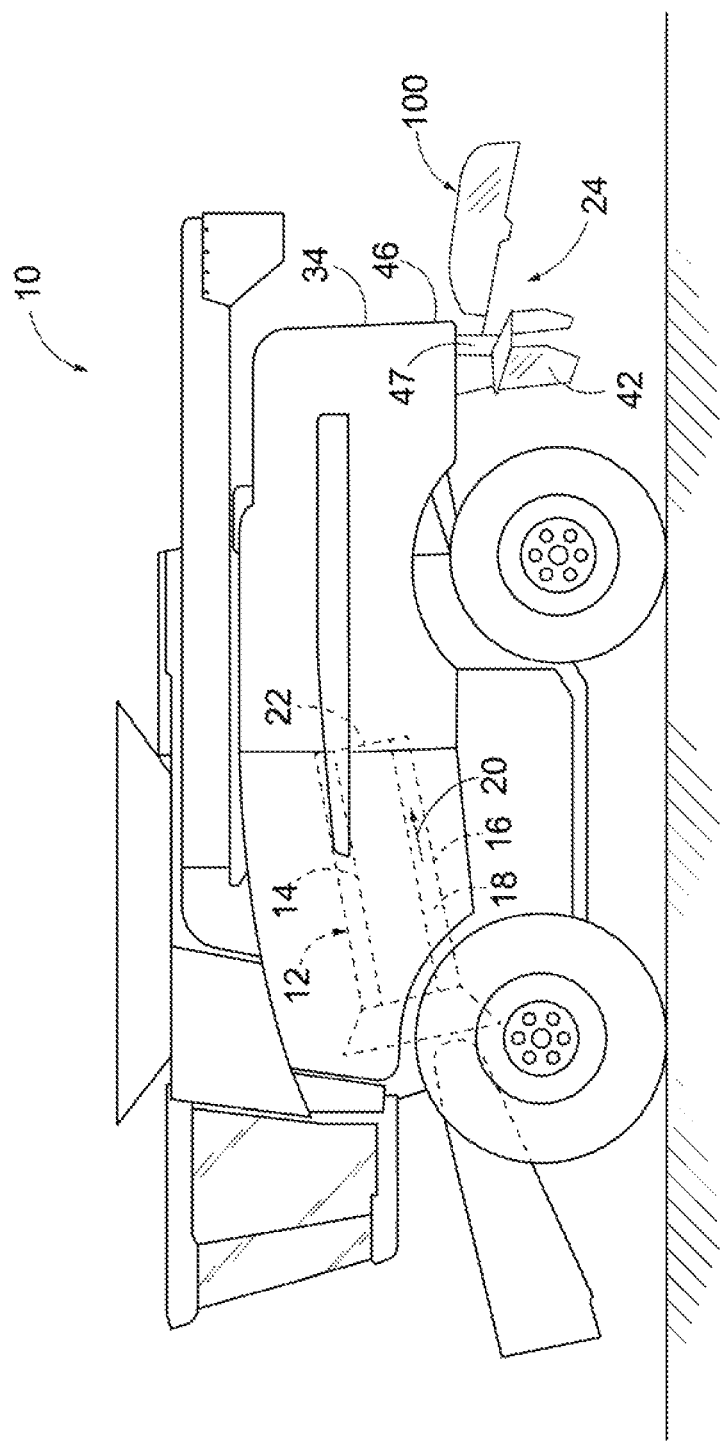
FIG. 1 is a side view of an agricultural combine that includes a windrow chute assembly in accordance with one embodiment.

Reference now will be made in detail to specific non-limiting examples illustrated in the drawings. Each example is provided by way of explanation, but not limitation. In fact, it will be apparent to those skilled in the art that various modifications and variations can be made to the described embodiments without departing from the scope of the invention. For instance, features illustrated or described as part of one embodiment can be used with another embodiment to yield a still further embodiment. Thus, it is intended that the present invention covers such modifications and variations.

Windrow chutes in accordance with this description can be used with various types of the agricultural machinery, including but not limited to combines. Referring now to the drawings, FIG. 1 illustrates a simplified, side view of one embodiment of an agricultural combine 10. In general, the combine 10 may be configured the same as or similar to any suitable agricultural combine known in the art, such as a conventional style combine or axial combine. For instance, as shown in FIG. 1, the combine 10 can include an axially arranged threshing system 12 and a cleaning system. As is generally understood, the threshing system 12 may include one or more cylindrical rotors 14 rotatably supported within a cage or concave 16 for conveying a flow of crop material in a helical flow path along a circumferential space 18 defined between the rotor 14 and the concave. As the crop material is moved through the space 18 towards a rear end 34 of the combine 10 (indicated by arrow 20), the crop (e.g., grain, legumes, and/or the like) may be separated from the crop residue (e.g., husks, pods and/or the like) and drop into the cleaning system. The crop residue may continue along the helical path and may be subsequently discharged through a discharge opening (not shown) defined at a downstream end 22 of the threshing system 12.

Combine 10 also includes a crop residue discharge system 24 for expelling crop residue from the combine to the field. Discharge system 24 includes a spreader 42 for evenly distributing the residue across the harvest width. In addition, discharge system 24 includes an opening 46 near the rear of the combine for windrowing. A windrow chute assembly 100 is mounted to a frame 47 on the rear of combine 10 just beneath opening 46.

Figure 2:
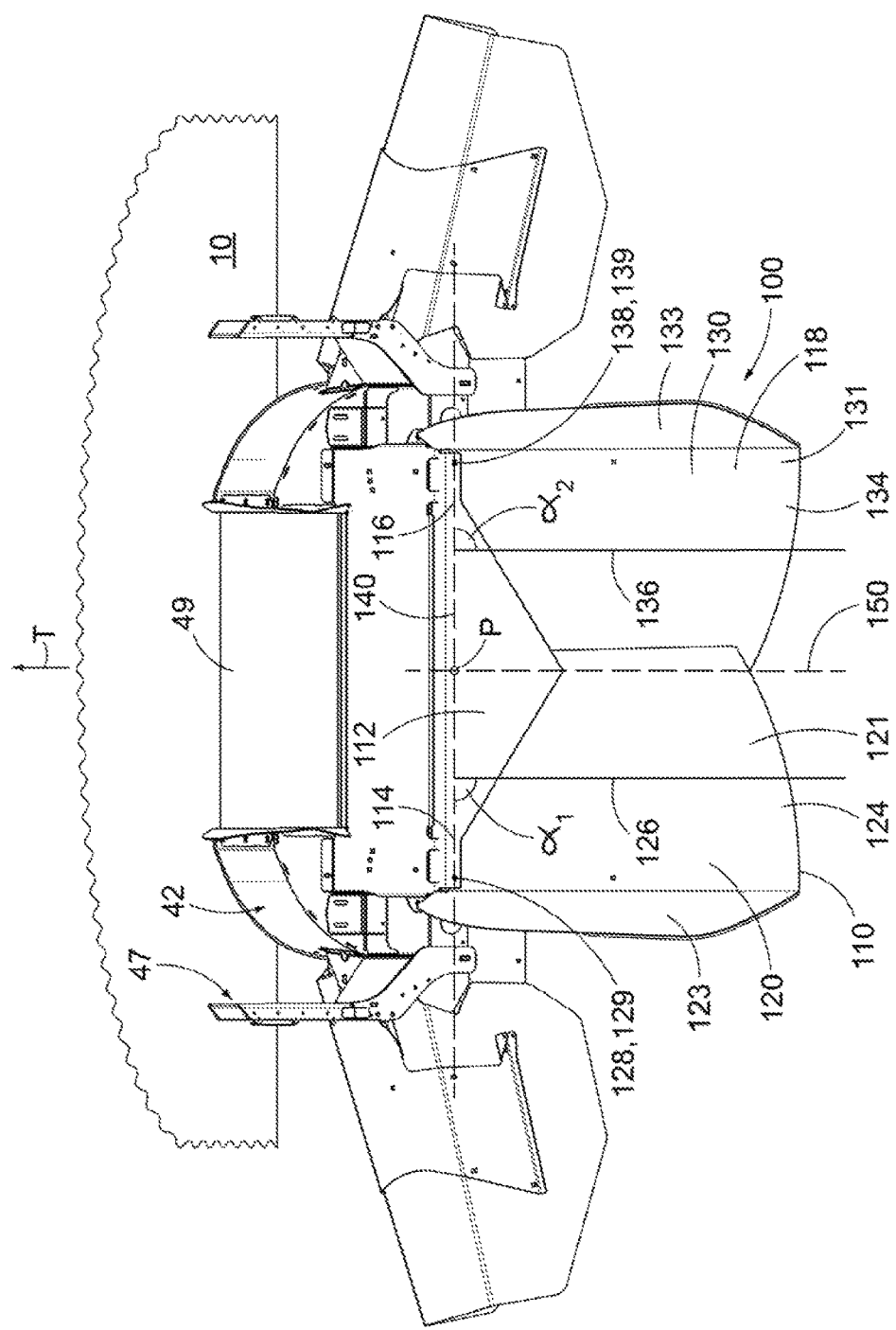
FIG. 2 is a perspective view of a rear section of the agricultural combine of FIG. 1, showing the windrow chute assembly in more detail in a first closed configuration.
Figure 3:
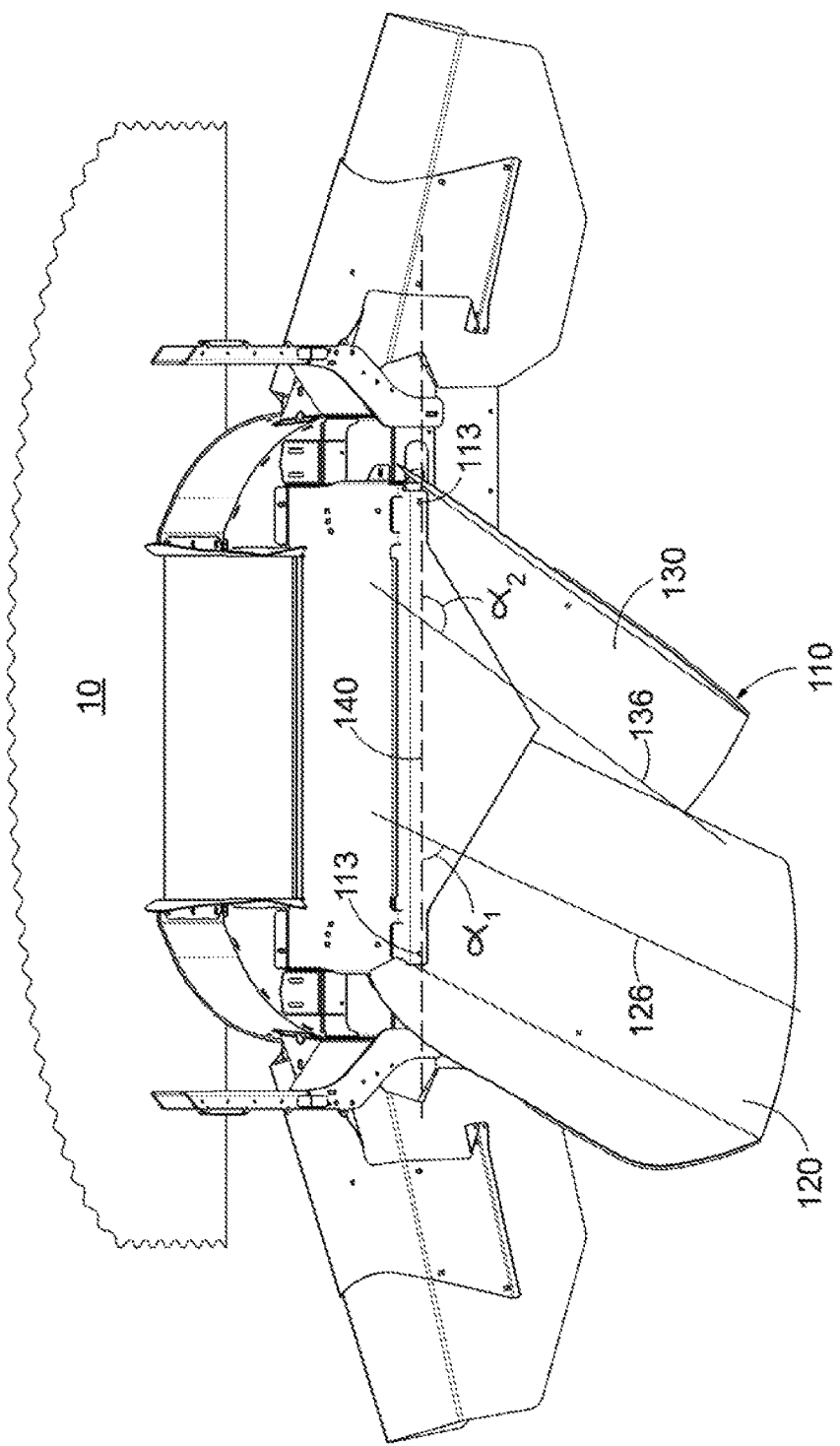
FIG. 3 is a perspective view of the rear section of the agricultural combine of FIG. 1, showing the windrow chute assembly in a second closed configuration.
Figure 4:
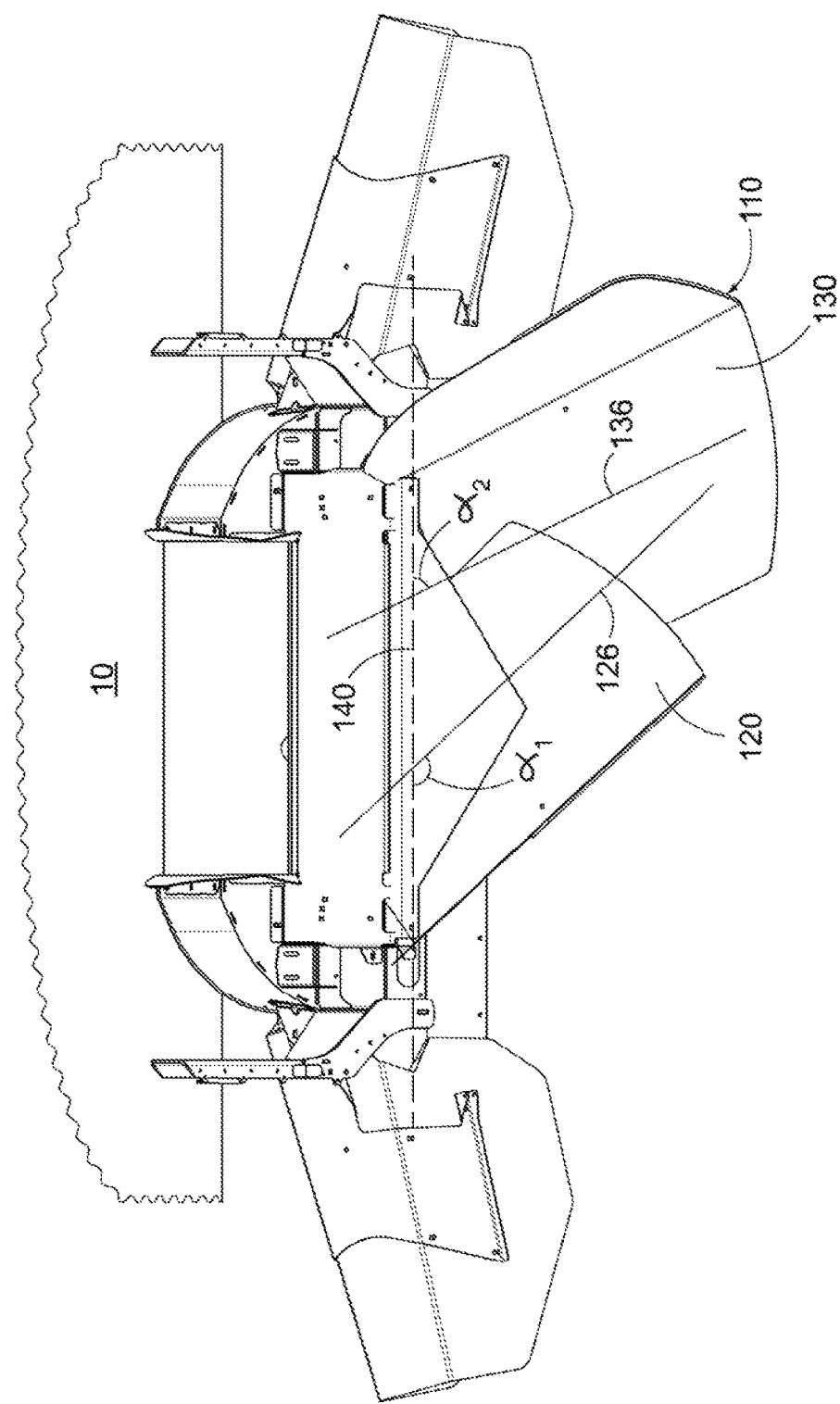
FIG. 4 is a perspective view of the rear section of the agricultural combine of FIG. 1, showing the windrow chute assembly in a third closed configuration.

Referring now to FIGS. 2-4, windrow chute assembly 100 is shown in more detail. Windrow chute assembly 100 is mounted to frame 47 and projects rearwardly from combine 10. A pivotable door 49 extends adjacent frame 47 and is operable in one of two positions to control how crop residue is discharged to the field. Door 49 can be pivoted to a closed position which allows crop residue to enter spreader 42, in which case the material is spread across the width of the cut. Alternatively, door 49 can be pivoted to an open position to bypass spreader 42 and direct crop residue to windrow chute assembly 100 for depositing the material onto the field in windrows.

Windrow chute assembly 100 includes a chute body 110. Chute body 110 includes a floor plate 112 having a generally triangular configuration as shown. Chute body 110 also includes a plurality of chute sections that are independently movable. Windrow chute assemblies can include any number of movable chute sections. In the present example, chute body 110 includes a first chute section 120 and a second chute section 130. It will be appreciated that the drawing figures are not necessarily to scale, and that first chute section 120 and second chute section 130 are not necessarily illustrated in correct proportion to the other parts of combine 10. As such, the illustrated dimensions of first chute section 120 and second chute section 130, including but not limited to their respective length, width and depth, are not to scale, and the actual dimensions could be much greater or much less than the dimensions as shown. By way of example, it is contemplated that the length of first chute section 120 and the length of second chute section 130 could be several times larger than that shown.

First chute section 120 has a first proximal end 122 for receiving material from combine 10, and a first distal end 124 opposite the first proximal end for discharging material from the combine. First chute section 120 also defines a first chute axis 126 that extends between first proximal end 122 and first distal end 124 as shown. Second chute section 130 has a second proximal end 132 for receiving material from combine 10, a second distal end 134 opposite the second proximal end for discharging material from the combine. Second chute section 130 also defines a second chute axis 136 extending between second proximal end 132 and second distal end 134 as shown.

Floor plate 112 has a first side 114 and a second side 116 opposite the first side. First proximal end 122 of first chute section 120 is movably mounted to first side 114, and second proximal end 132 of second chute section 130 is movably mounted to second side 116. Chute sections can be mounted to frames or floor plates in a variety of ways that allow the chute sections to move either independently or in unison. In the present example, first proximal end 122 of first chute section 120 is pivotably mounted to first side 114 with a first pivot joint 128. Similarly, second proximal end 132 of second chute section 130 is pivotably mounted to second side 116 with a second pivot joint 138. In this arrangement, first chute section 120 is pivotally mounted on a first pivot axis 129 that passes through first pivot joint 128. Similarly, second chute section 130 is pivotally mounted on a second pivot axis 139 that passes through second pivot joint 138. Second pivot axis 139 is parallel to and offset from first pivot axis 138. Pivot joints can take various forms, including but not limited to pin connections. In the present example, first pivot joint 128 and second pivot joint 138 include pins 113 that pass through bores that extend through the first and second chute sections 120, 130 and floor plate 112.

A transverse axis 140 is defined between first proximal end 122 of first chute section 120 and second proximal end 132 of second chute section 130. More specifically, transverse axis 140 intersects and extends between first pivot joint 128 and second pivot joint 138 as shown. Transverse axis 140 is perpendicular to the direction of forward travel T of combine 10. First pivot axis 129 and second pivot axis 139 are vertical axes that intersect transverse axis 140 and are perpendicular to the transverse axis. A center axis 150 extends perpendicularly to transverse axis 140. Center axis 150 extends through a point P on transverse axis 140 that is equidistant from first pivot axis 129 and second pivot axis 139.

First chute section 120 and second chute section 130 are pivotably displaceable, independently of one another, and can assume an infinite number of positions and configurations relative to transverse axis 140. For example, first chute section 120 and second chute section 130 can be pivotably adjusted to a closed configuration to deposit crop residue onto the field in a narrow windrow. First chute section 120 and second chute section 130 can also be pivotably adjusted to a partially closed configuration to deposit crop residue onto the field in a wider windrow than in the closed configuration. In this way, the cross sectional shape and width of each windrow can be controlled by selecting a closed configuration or a partially closed configuration that corresponds to the desired windrow shape and width. Furthermore, first chute section 120 and second chute section 130 can be pivotably adjusted to an open position, in which the first and second chute sections are moved outwardly and away from center axis 150, and toward the sides of the combine, where they do not obstruct the rear area of the combine. This ability to move the chute sections to the sides allows personnel standing on the ground to reach areas on the rear of the combine. For example, personnel can manually pivot the chute sections to the open position to reach items such as access handles and ladders that are pulled down to access the engine compartment. Each of the closed, partially closed, and open configurations will be described in more detail in the sections that follow.

First chute section 120 is pivotably displaceable relative to floor plate 112 so as to define a first angle of displacement $\alpha_1$ between first chute axis 126 and transverse axis 140. Likewise, second chute section 130 is pivotably displaceable relative to floor plate 112 so as to define a second angle of displacement $\alpha_2$ between second chute axis 136 and transverse axis 140. When in a closed configuration or a partially closed configuration, first chute section 120 and second chute section 130 can be pivotably adjusted to various angles relative to transverse axis 140 to control the position of each windrow relative to the center line of combine 10. For example, first and second chute sections 120 and 130 can be pivoted to the left to deposit the windrow on a left side of the combine's center line, or to the right to deposit the windrow on a right side of the combine's center line.

Chute sections can be designed to abut one another in the closed configuration. Alternatively, chute sections can be designed to partially overlap one another in the closed configuration. In the present example, first chute section 120 and second chute section 130 partially overlap when in the closed configuration. The extent of overlap varies depending on the relative orientations of first and second chute sections 120 and 130 when they are in a closed configuration. First and second chute sections 120 and 130 can assume an infinite number of positions when in the closed configuration. These positions fall into one of three general categories, namely, a "zero" position, a "left-bias" position, and a "right-bias" position, as will be explained.

Figure 6:
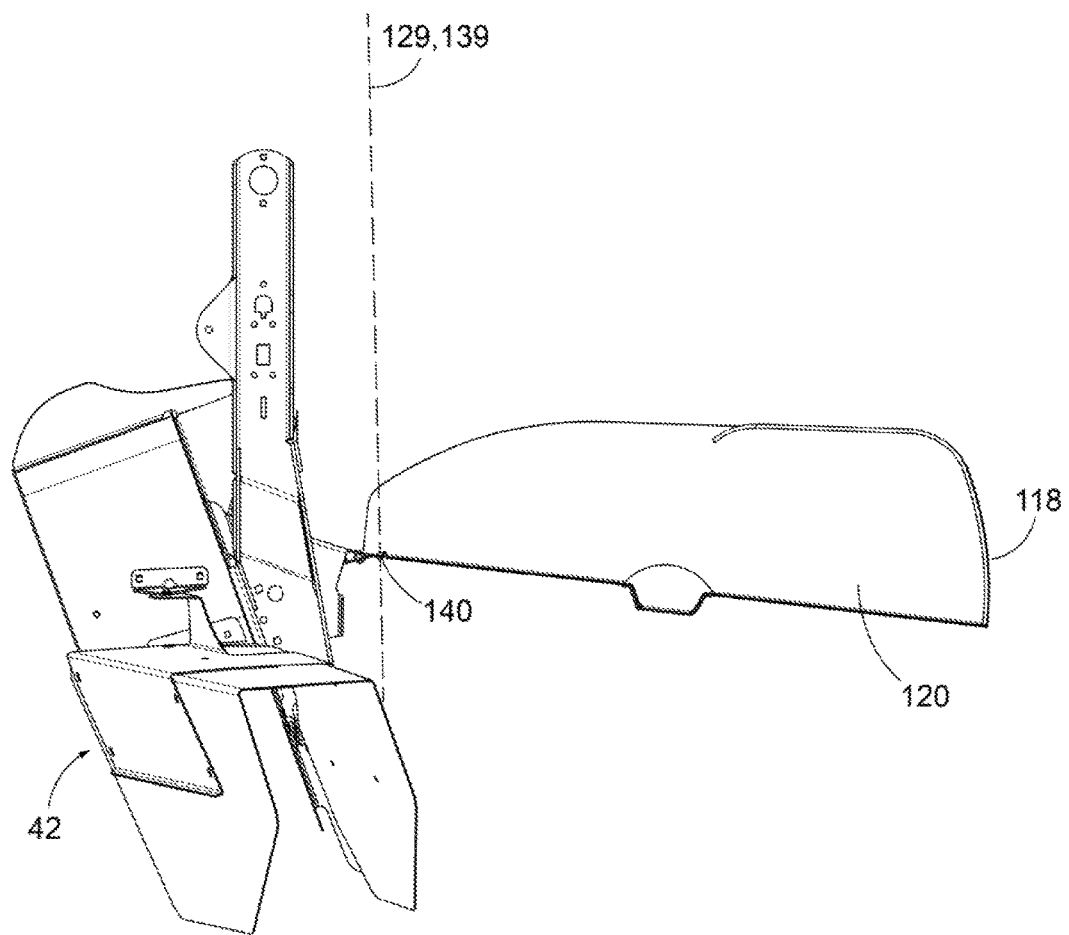
FIG. 6 is a side view of the rear section of the agricultural combine and windrow chute assembly of FIG. 1 shown in the first closed configuration in FIG. 2.

Referring to FIGS. 2 and 6, first chute section 120 and second chute section 130 are pivoted toward one another in a closed configuration in which the chute sections are in the zero position. In this configuration, first chute section 120 and second chute section 130 are oriented such that chute body 110 discharges crop residue directly behind combine 10 on a line coinciding with the center line of the combine. First chute section 120 is pivoted inwardly 90 degrees relative to transverse axis 140, such that $\alpha_1$ is equal to 90 degrees. Likewise, second chute section 130 is pivoted inwardly 90 degrees relative to transverse axis 140, such that $\alpha_2$ is equal to 90 degrees. First chute axis 126 and second chute axis 136 are parallel to one another and to center axis 150. The sum of $\alpha_1$ and $\alpha_2$ is equal to 180 degrees.

Referring to FIG. 3, first chute section 120 and second chute section 130 are shown in another closed configuration, with the chute sections pivoted to a left-bias position. In this configuration, first chute section 120 and second chute section 130 are oriented such that the chute body 110 discharges crop residue on a line offset to the left of the center line of combine 10. For purposes of this description, the term "left" refers to the left side of the center line when facing the rear of the combine. First chute section 120 and second chute section 130 can be sufficiently long to deposit the windrow at any desired distance from the center line, including a distance beyond the left tire track of combine 10. With the windrow placed outside of the tire tracks, a grain cart and tractor of equal width following directly behind combine 10 does not have to straddle the windrow while receiving grain from the combine. Therefore, there is no risk that the grain cart and/or tractor will run over and disrupt the windrow as they follow combine 10. First chute section 120 is pivoted inwardly approximately 65 degrees relative to transverse axis 140, such that $\alpha_1$ is equal to 65 degrees. Second chute section 130 is pivoted inwardly 125 degrees relative to transverse axis 140, such that $\alpha_2$ is equal to 125 degrees. In this configuration, first chute section 120 overlaps second chute section 130. As such, first chute axis 126 and second chute axis 136 are not parallel to one another. The sum of $\alpha_1$ and $\alpha_2$ is equal to 190 degrees.

Referring to FIG. 4, first chute section 120 and second chute section 130 are shown in another closed configuration, with the chute sections pivoted to a right-bias position. In this configuration, first chute section 120 and second chute section 130 are oriented such that the chute body 110 discharges crop residue on a line offset to the right of the center line of combine 10. For purposes of this description, the term, "right" refers to the right side of the center line when facing the rear of the combine. First chute section 120 and second chute section 130 can be sufficiently long to deposit the windrow at any desired distance from the center line, including a distance beyond the right tire track of combine 10. With the windrow placed outside of the tire tracks, a grain cart and tractor of equal width following directly behind combine 10 does not have to straddle the windrow, as noted above. Therefore, there is no risk that the grain cart and/or tractor will run over and disrupt the windrow as they follow combine 10. First chute section 120 is pivoted inwardly approximately 125 degrees relative to transverse axis 140, such that $\alpha_1$ is equal to 125 degrees. Second chute section 130 is pivoted inwardly 65 degrees relative to transverse axis 140, such that $\alpha_2$ is equal to 65 degrees. In this configuration, first chute section 120 overlaps second chute section 130. As such, first chute axis 126 and second chute axis 136 are not parallel to one another. The sum of $\alpha_1$ and $\alpha_2$ is equal to 190 degrees.

Windrow chute assembly 100 can be pivoted to a closed configuration and remain fixed in that configuration during a windrow operation, with $\alpha_1$ and $\alpha_2$ remaining fixed (static mode). In addition, or in the alternative, windrow chute assembly 100 can pivot in a closed configuration during a windrow operation, with $\alpha_1$ and $\alpha_2$ changing in response to operating conditions (dynamic mode). For example, windrow chute assembly 100 can operate in the static mode, with the first and second chute sections in the zero position, as the combine is in the middle of a long windrow. When the combine reaches the end of the windrow and begins to turn around for the next pass, windrow chute assembly 100 can switch to a dynamic mode, in which the first and second chute sections gradually pivot toward a left-bias or right-bias configuration. As the first and second chute sections pivot to the left-bias or right-bias configuration during the turn, the windrow is discharged to the ground more smoothly than would be the case if the chute sections remain in the zero position, because the windrow is discharged along a curve that more closely to conforms to the shape of the arc through which the chute sections travel during the turn When operating in a dynamic mode, the direction of bias will be the same direction as the turning direction. In the case of a right turn, for example, the operator can steer the first and second windrow chute sections from the zero position to the right-bias position during the turn. In the right-bias position, the chute sections are more tangential to the arc of the turn than in the zero position, which allows the windrow to be dropped more smoothly along an arc at the end of the windrow. The reverse would be done during a left turn. By steering the windrow chute assembly 100 in response to steering of the combine, the operator can compensate for the changing orientation of the combine to maintain a smooth trajectory for the material being discharged. This results in a neater windrow at the end of each pass. If the windrow chute is kept in the zero position during the turn, the windrow will be discharged in a radially outward direction with respect to the arc shaped direction of travel, rather than tangentially. Straw that is discharged radially outwardly from the arc can succumb to a shearing action as the straw contacts the ground. This causes the material to roll, stretch, become degraded, and land in an irregular path or shape that a front steer baler can have trouble following.

First and second windrow chute sections 120 and 130 can be pivotally adjusted using any type of manually controlled mechanism, including but not limited to a manual linkage connected to one or more handles or levers attached to the chute sections at the rear of the combine. In addition, or in the alternative, first and second windrow chute sections 120 and 130 can be pivotally adjusted or steered using one or more actuators located at the windrow chutes that are controlled in the cab of the combine. The actuators can be controlled using software, steering sensors or other feedback systems. Suitable actuators include, but are not limited to, any type of electric, hydraulic or cable actuator for controlling the position of each windrow chute.

The zero position, left-bias position and right-bias position shown in FIGS. 2-4 represent three different closed configurations. It should be appreciated that the zero position, left-bias position and right-bias position shown in FIGS. 2-4 are not the only positions in which the first chute section 120 and second chute section 130 can be arranged in a closed configuration. First chute section 120 and second chute section 130 can be arranged in other closed configurations with values for $\alpha_1$ and $\alpha_2$ that are different than those shown. First chute section 120 and second chute section 130 can also be arranged in an infinite number of partially closed configurations in which the first and second chute sections overlap to a lesser extent, and therefore are slightly more spread apart as compared to the closed configurations. Referring back to FIG. 2, for example, first chute section 120 could be pivoted two degrees away from second chute section 130. Similarly, second chute section 130 could be pivoted two degrees away from first chute section 120. This would result in a partially closed configuration, with first chute axis 126 and second chute axis 136 each offset from transverse axis 140 by 88 degrees instead of 90 degrees. First chute axis 126 and second chute axis 136 would each be offset from center axis 150 by two degrees. As such, first distal end 124 and second distal end 134 would be spread apart wider than shown in FIG. 2, creating a wider chute at the distal ends to create a wider windrow than would be provided by the configuration shown in FIG. 2. This outward adjustment of first chute section 120 and second chute section 130 can be applied to any of the closed configurations shown in FIGS. 2-4 to create a partially closed configuration that produces a wider windrow.

Figure 5:
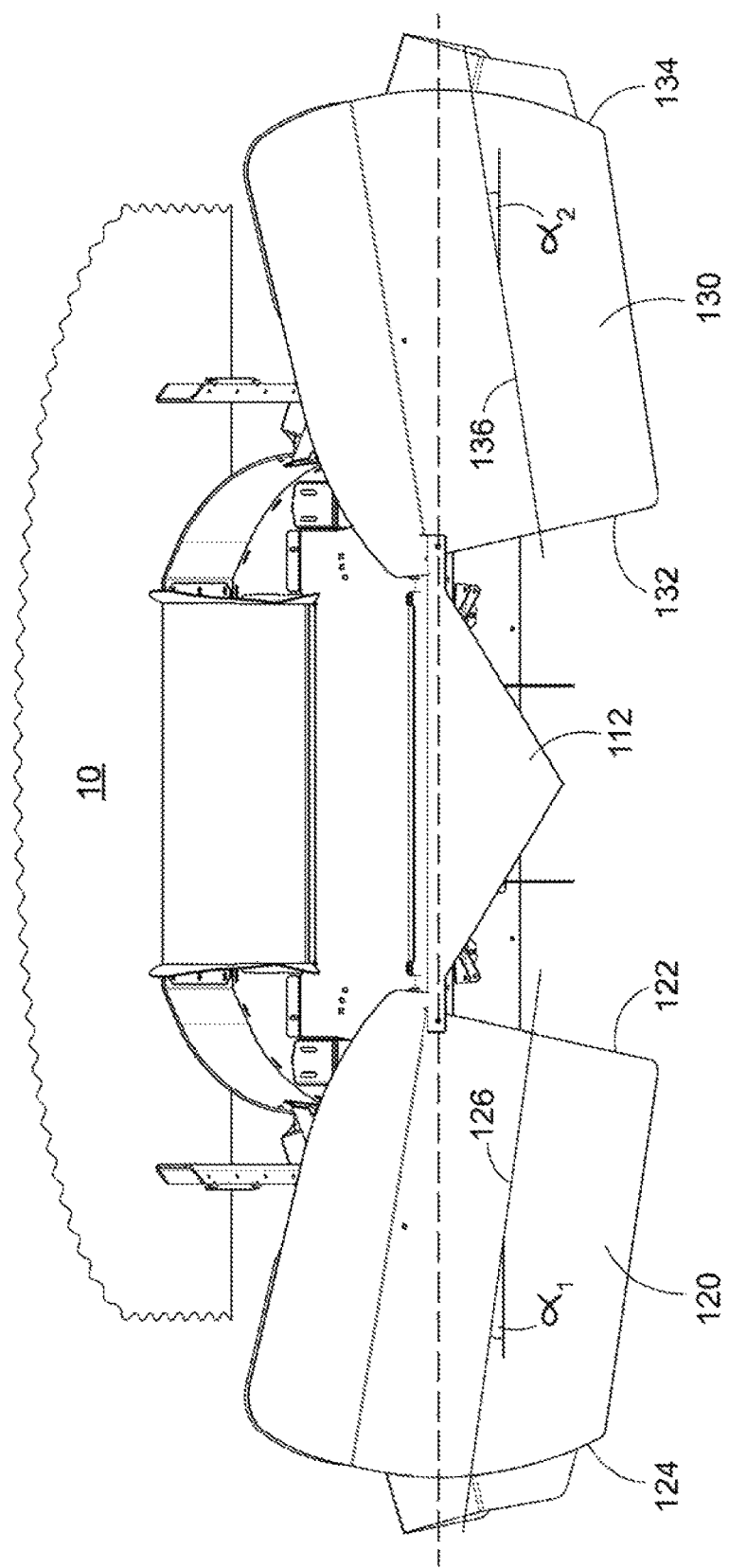
FIG. 5 is a perspective view of the rear section of the agricultural combine of FIG. 1, showing the windrow chute assembly in an open configuration.
Figure 7:
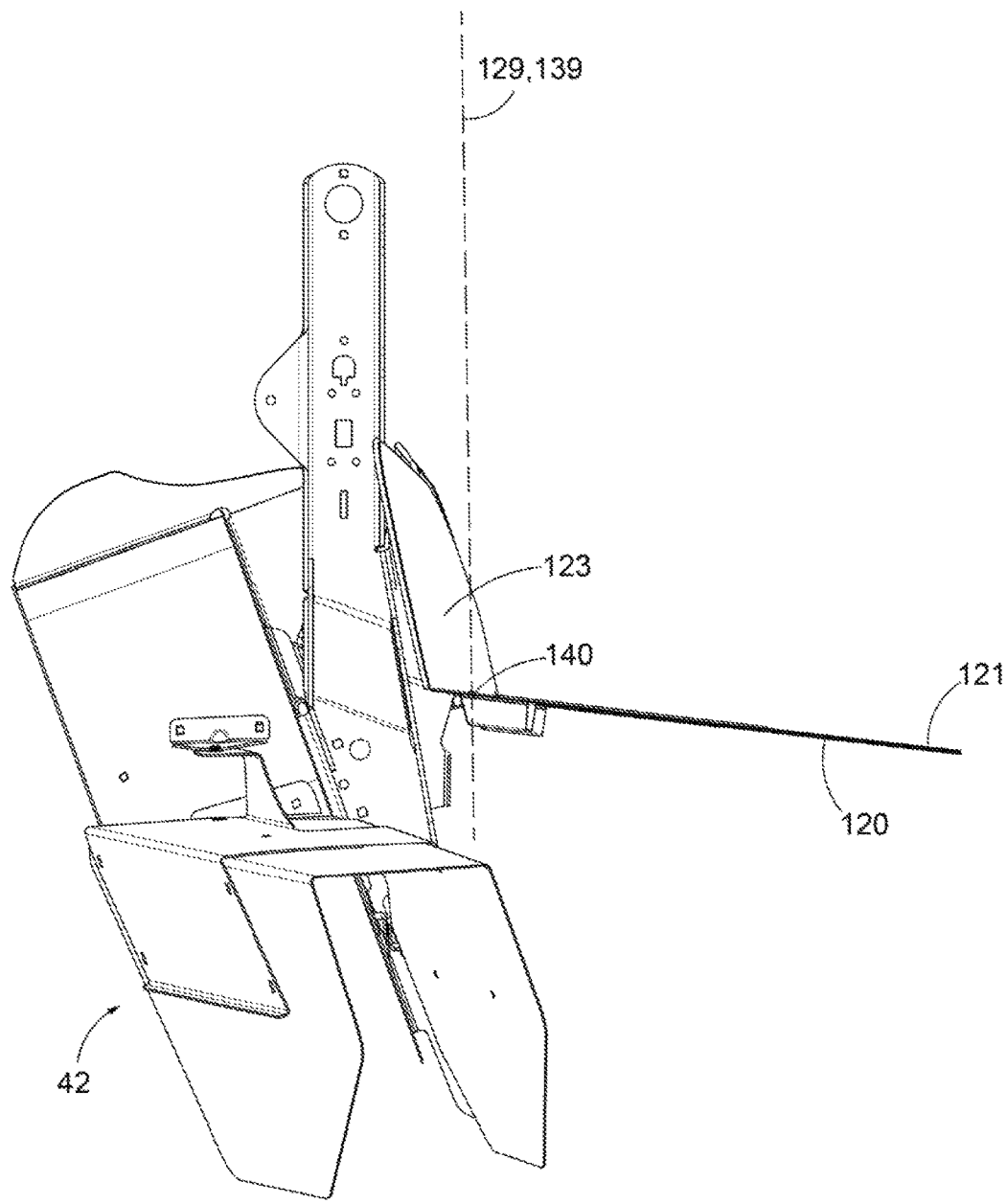
FIG. 7 is a side view of the rear section of the agricultural combine and windrow chute assembly of FIG. 1 shown in the open configuration in FIG. 5.

Referring now to FIGS. 5 and 7, windrow chute assembly 100 is shown with first and second chute sections 120 and 130 in the open configuration. In this configuration, first chute section 120 is pivoted away from second chute section 130 to a maximum extent, such that first chute axis 126 is pivoted beyond transverse axis 140 by an angle of −10 degrees. Likewise, second chute section 130 is pivoted away from first chute section 120 to a maximum extent, such that second chute axis 136 is pivoted beyond transverse axis 140 by an angle of −10 degrees. Due to the limited space in FIG. 5, the point of intersection between first chute axis 126 and transverse axis 140, and the point of intersection between second chute axis 136 and the transverse axis occur at or close to the edge of the Figure. Therefore, first angle of displacement $\alpha_1$ and the second angle of displacement $\alpha_2$ are shown at different locations along the first and second chute axes. First angle of displacement $\alpha_1$ is −10 degrees, and second angle of displacement $\alpha_2$ is −10 degrees.

In summary, first chute section 120 and second chute section 130 are each capable of pivoting relative to transverse axis 140 through a range of −10 degrees to 125 degrees. The maximum sum of the first angle of displacement $\alpha_1$ and second angle of displacement $\alpha_2$ is 190 degrees. The minimum sum of the first angle of displacement $\alpha_1$ and second angle of displacement $\alpha_2$ is −20 degrees. It will be appreciated that the chute assemblies can be designed with chute sections that have smaller or larger pivot ranges. For example, an alternative design could feature chute sections that do not pivot past the transverse axis. In such a design, the first angle of displacement $\alpha_1$ and second angle of displacement $\alpha_2$ would each be 0 degrees when the first and second chute sections are moved to the open configuration. The minimum sum of $\alpha_1$ and $\alpha_2$ would be 0 degrees.

In the same design, or another alternative design, the first chute section and second chute section could assume the zero position when each chute section pivots through an angle greater than 90 degrees relative to the transverse axis. In such a design, the first chute axis would intersect the second chute axis when the chute sections are in the zero position. As each chute section is pivoted closer and closer toward the zero position, the width of the chute body at the distal end would decrease, providing a decreased windrow width.

Referring back to FIG. 2, first chute section 120 includes a first bottom wall section 121 and a first sidewall section 123. Similarly, second chute section 130 includes a second bottom wall section 131 and a second sidewall section 133. First bottom wall section 121 and second bottom wall section 131 are configured to convey crop residue out of first chute section 120 and second chute section 130, respectively. First bottom wall section 121 partially extends over second bottom wall section 131 in the closed configuration, such that the first and second bottom wall sections overlap. First sidewall section 131 and second sidewall section 133 also assist with conveying crop residue out of first chute section 120 and second chute section 130, respectively, while also limiting outward dispersion of material. This keeps the crop residue concentrated so that the material exits chute body 110 in a narrow stream to create a narrow windrow.

First bottom wall section 121 and first sidewall section 131 form an L-shaped profile, as seen best in FIG. 7, which shows the L-shaped profile of first chute 120. Similarly, second bottom wall section 121 and second sidewall section 131 form an L-shaped profile that is the mirror or reverse image of the profile created by first bottom wall section 121 and first sidewall section 131. In this arrangement, first chute section 120 and second chute section 130 form an open channel 118 when the chute sections are brought together in the closed configuration. That is, first chute section 120 and second chute section 130 form a box shaped channel having a bottom wall and two sidewalls, the channel being open at the top with no top wall.

It will be appreciated that windrow chute assemblies can be designed with chute sections having other geometries suitable for conveying crop residue and depositing the material in windrows. For example, the first chute section could have a first round concave shape and the second chute section could have a second round concave shape that forms an open U-shaped channel in a closed configuration. Alternatively, first chute section and second chute section could each be in the form of three-sided rectangles, each having a top face, side face and bottom face, and being open on the sides facing one other, thereby forming a box-shaped conduit in the closed configuration that is closed on all sides. Regardless of the selected geometry, the cross sectional profile of first chute section can be the mirror image of the cross sectional profile of the second chute section, thereby forming a symmetrical shape in the open and closed configurations. Alternatively, the cross sectional profile of first chute section can be different from the cross sectional profile of the second chute section, thereby forming an asymmetrical shape in the open and closed configurations.

Figure 8:
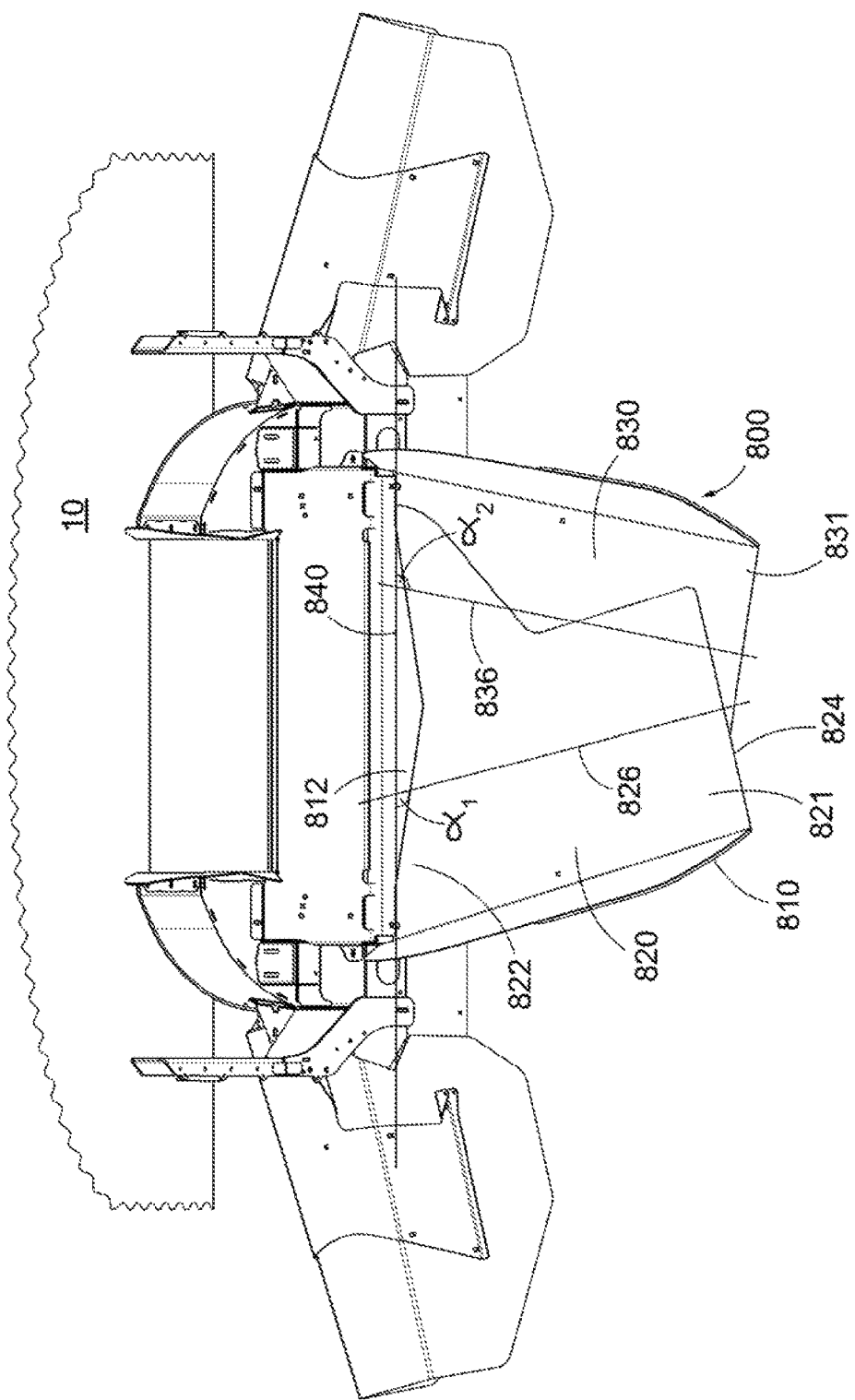
FIG. 8 is a perspective view of a rear section of the agricultural combine of FIG. 1, showing a windrow chute assembly in accordance with another embodiment, the windrow chute assembly shown in a closed configuration.
Figure 9:
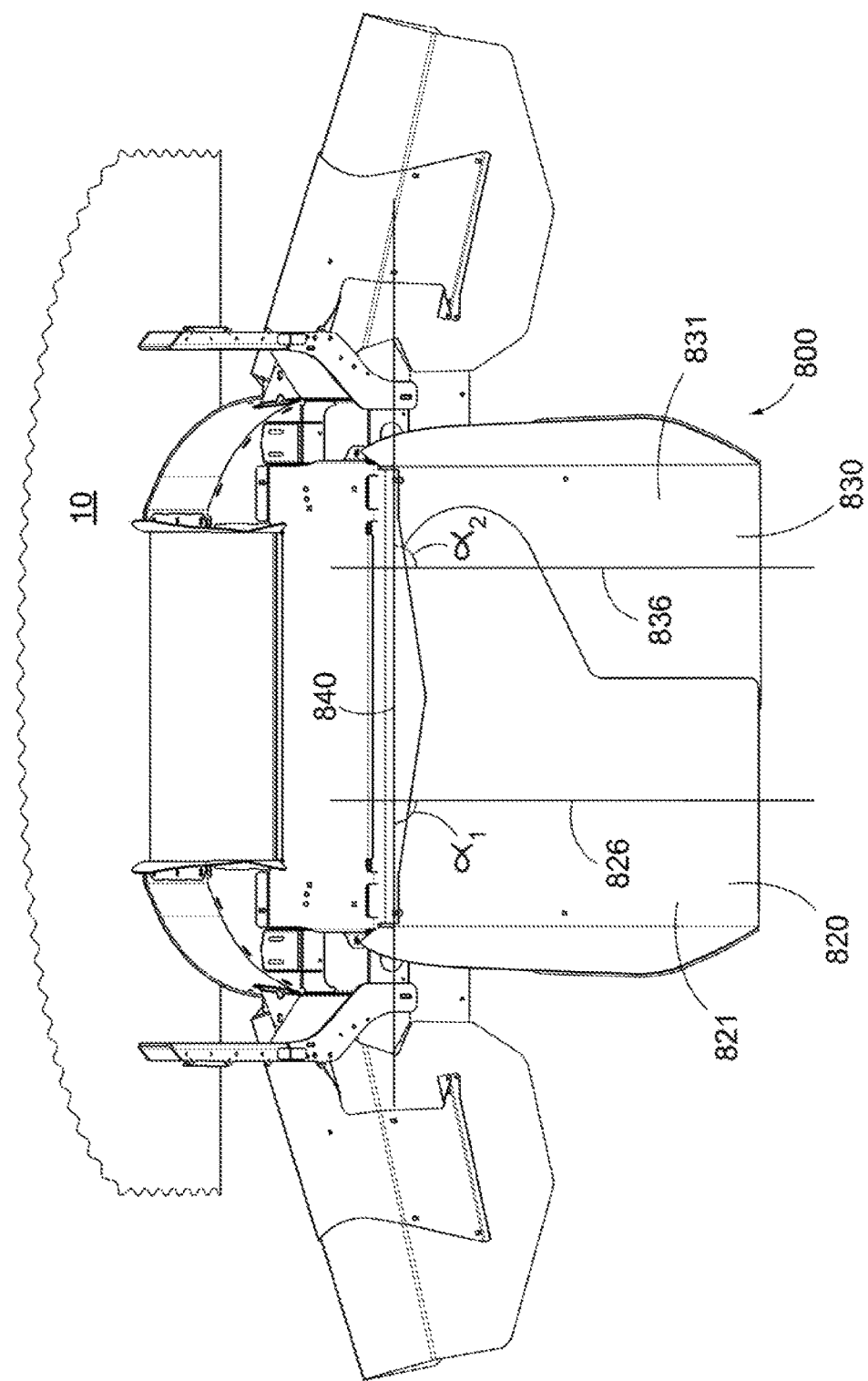
FIG. 9 is a perspective view of the rear section of the agricultural combine and windrow chute assembly of FIG. 8, showing the windrow chute assembly in a partially closed configuration.
Figure 10:
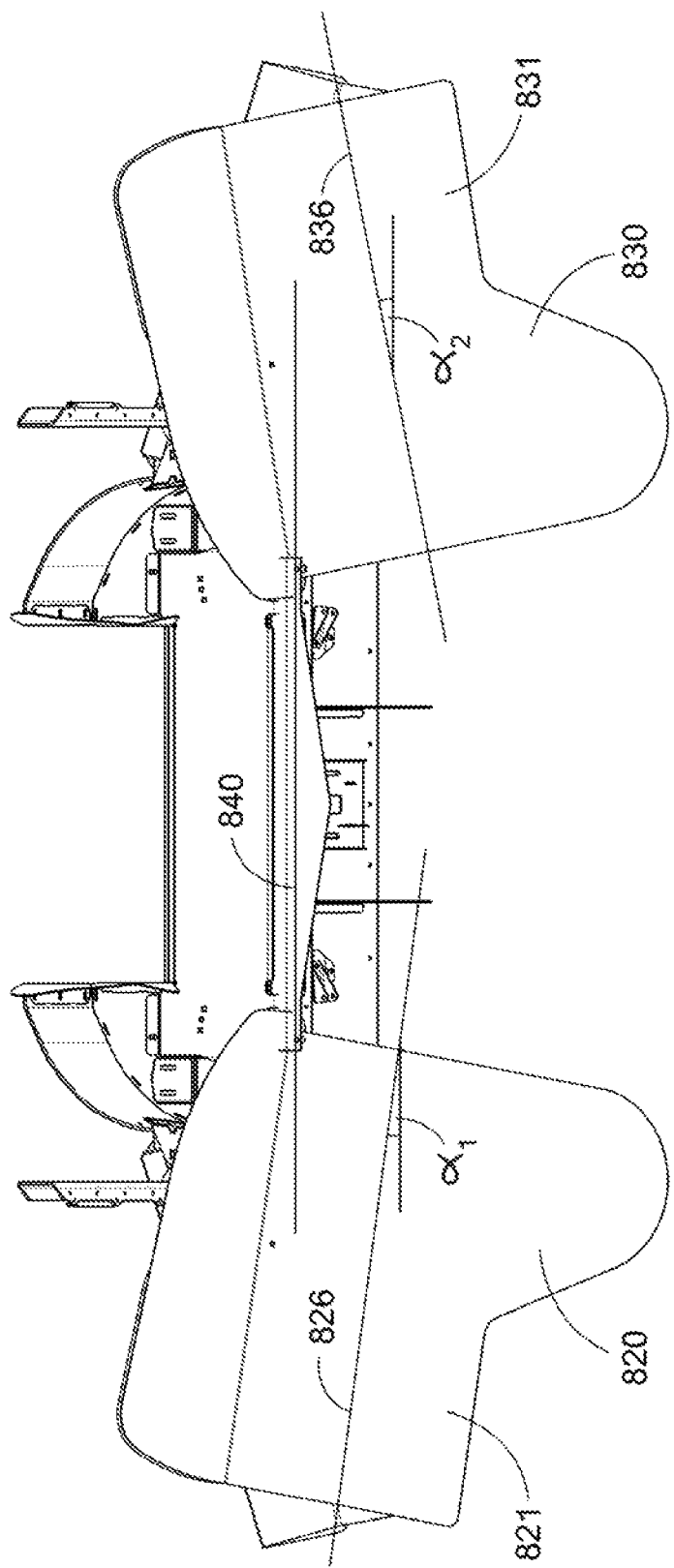
FIG. 10 is a perspective view of the rear section of the agricultural combine and windrow chute assembly of FIG. 8, showing the windrow chute assembly in an open configuration.

FIGS. 8-10 illustrate a windrow chute assembly 800 in accordance with another embodiment. Windrow chute assembly 800 has many of the same components as windrow chute assembly 100. For brevity, some components that are identical to corresponding components in windrow chute assembly 100 will not be described.

Windrow chute assembly 800 includes a chute body 810 with a floor plate 812 having a narrow triangular configuration as shown. Chute body 810 also includes a first chute section 820 with a first chute axis 826 and a second chute section 830 with a second chute axis 836. First chute section 820 has a bottom wall 821 having a "P" shaped profile as shown, with a first proximal end 822 that is much wider than a first distal end 824. Second chute section 830 has a bottom wall 831 with a "backward P" shaped profile that is the mirror or reverse image of the "P" shaped profile of first chute section 820.

First chute section 820 and second chute section 830 assume the closed position when each chute section pivots through an angle greater than 90 degrees relative to the transverse axis 840, as shown in FIG. 8. In particular, first chute section 820 and second chute section 830 each pivot through an angle of 110 degrees relative to transverse axis 840. As such, first angle of displacement $\alpha_1$ is equal to 110 degrees, and second angle of displacement $\alpha_2$ is equal to 110 degrees. First chute axis 826 intersects second chute axis 836 in this configuration. In FIG. 9, windrow chute assembly 800 is shown in a partially closed configuration, where each chute section is pivoted through an angle equal to 90 degrees relative to the transverse axis. In FIG. 10, windrow chute assembly 800 is shown in an open configuration, where each chute section is pivoted through an angle equal to −10 degrees relative to transverse axis 840.

Figure 11:
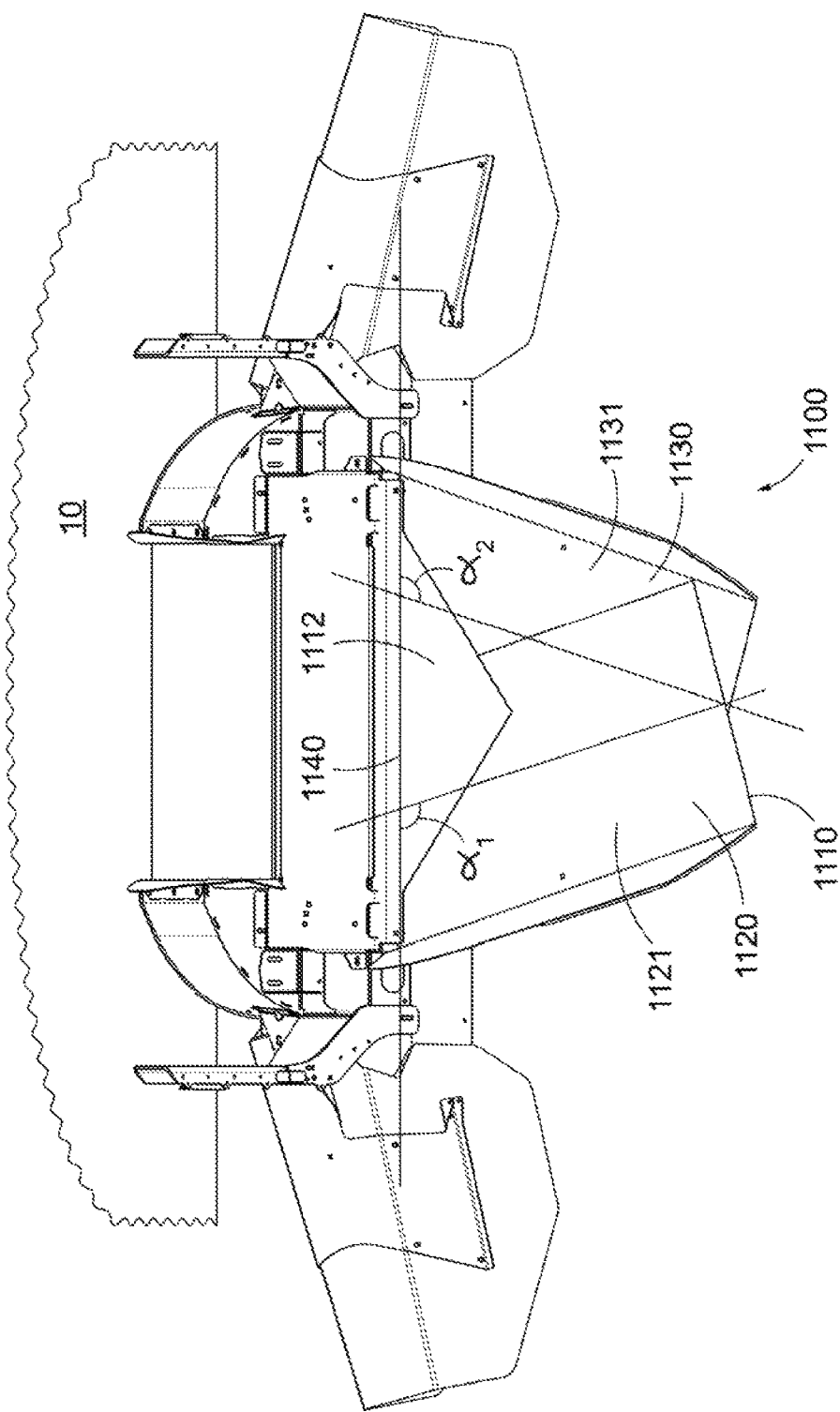
FIG. 11 is a perspective view of a rear section of the agricultural combine of FIG. 1, showing a windrow chute assembly in accordance with another embodiment, the windrow chute assembly shown in a closed configuration.
Figure 12:
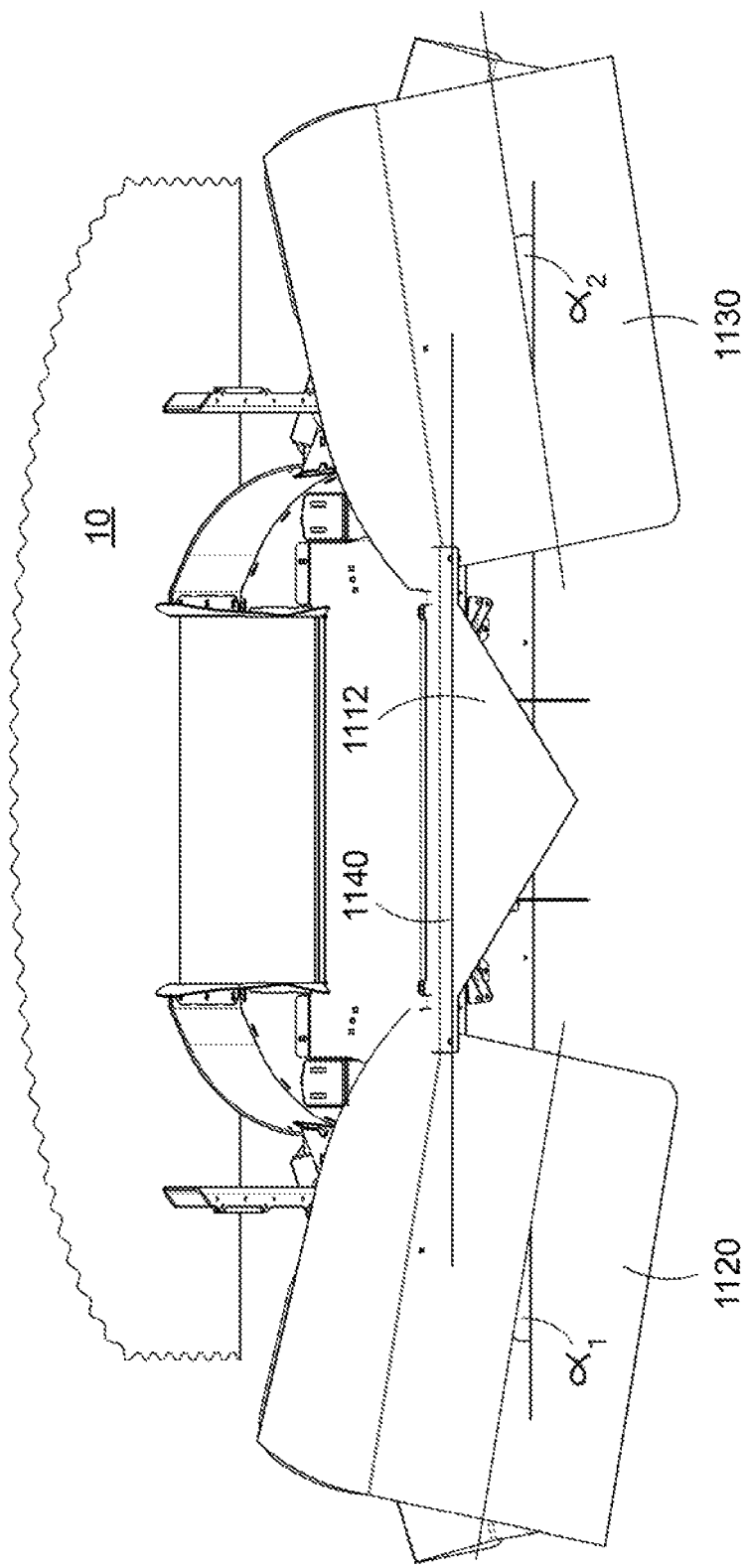
FIG. 12 is a perspective view of the rear section of the agricultural combine and windrow chute assembly of FIG. 11, showing the windrow chute assembly in an open configuration.

FIGS. 11 and 12 illustrate a windrow chute assembly 1100 in accordance with another embodiment. Windrow chute assembly 1100 has many of the same components as windrow chute assemblies 100 and 800. For brevity, some components that are identical to corresponding components in windrow chute assemblies 100 and 800 will not be described.

Windrow chute assembly 1100 includes a chute body 1110 with a floor plate 1112 having a triangular configuration as shown. Chute body 1110 also includes a first chute section 1120 with a first chute axis 1126 and a second chute section 1130 with a second chute axis 1136. First chute section 1120 has a bottom wall having a rectangular shaped profile as shown, with a first proximal end 1122 and a first distal end 1124. First proximal end 1122 has the same width as first distal end 1124. Second chute section 1130 also has a bottom wall 1131 with a rectangular shaped profile that is the mirror or reverse image of the rectangular shaped profile of first chute section 1120.

First chute section 1120 and second chute section 1130 assume the closed position when each chute section pivots through an angle greater than 90 degrees relative to the transverse axis, as shown in FIG. 11. In particular, first chute section 1120 and second chute section 1130 each pivot through an angle of 110 degrees relative to the transverse axis 1140. As such, first angle of displacement $\alpha_1$ is equal to 110 degrees, and second angle of displacement $\alpha_2$ is equal to 110 degrees. In FIG. 12, windrow chute assembly 1100 is shown in an open configuration, where each chute section is pivoted through an angle equal to −10 degrees relative to transverse axis 1140.

What is claimed is:

1. A windrow chute assembly for an agricultural vehicle, the windrow chute assembly comprising:

a chute body comprising a plurality of movable chute sections, the plurality of movable chute sections comprising a first chute section and a second chute section, the first chute section having a first proximal end for receiving material from the agricultural vehicle, a first distal end opposite the first proximal end for discharging material from the agricultural vehicle, and a first chute axis extending between the first proximal end and the first distal end, the second chute section having a second proximal end for receiving material from the agricultural vehicle, a second distal end opposite the second proximal end for discharging material from the agricultural vehicle, and a second chute axis extending between the second proximal end and the second distal end, the first proximal end of the first chute section and the second proximal end of the second chute section defining a transverse axis therebetween, the first chute section being displaceable so as to define a first angle of displacement between the first chute axis and the transverse axis, and the second chute section being displaceable so as to define a second angle of displacement between the second chute axis and the transverse axis, and the first chute section and the second chute section being displaceable toward one another to a closed configuration, in which a sum of the first angle of displacement and the second angle of displacement is a maximum, and displaceable away from one another to an open configuration, in which the sum of the first angle of displacement and the second angle of displacement is a minimum;

wherein the first chute section is pivotally mountable on a first pivot axis, and the second chute section is pivotally mountable on a second pivot axis offset from the first pivot axis.

2. The windrow chute assembly of claim 1, wherein the first pivot axis is parallel to the second pivot axis.

3. The windrow chute assembly of claim 1, wherein the first pivot axis and the second pivot axis are perpendicular to the transverse axis.

4. The windrow chute assembly of claim 1, wherein the first pivot axis and the second pivot axis are vertical axes.

5. The windrow chute assembly of claim 1, wherein the first chute section is displaceable through an angle greater than ninety degrees relative to the transverse axis, and the second chute section is displaceable through an angle greater than ninety degrees relative to the transverse axis.

6. The windrow chute assembly of claim 1, wherein the sum of the first angle of displacement and the second angle of displacement is 180 degrees when the first chute section and the second chute section are in the closed configuration.

7. The windrow chute assembly of claim 1, wherein the sum of the first angle of displacement and the second angle of displacement is less than 0 degrees when the first chute section and the second chute section are in the open configuration.

8. The windrow chute assembly of claim 1, further defining a center axis that extends perpendicularly to the transverse axis at a point equidistant from the first proximal end of the first chute section and the second proximal end of the second chute section.

9. The windrow chute assembly of claim 8, wherein the first chute section and the second chute section are each pivotable toward the center axis to assume a zero position.

10. The windrow chute assembly of claim 9, wherein the first chute axis is parallel to the second chute axis in the zero position.

11. The windrow chute assembly of claim 9, wherein the first chute axis intersects the second chute axis in the closed configuration.

12. The windrow chute assembly of claim 8, wherein the first chute section and the second chute section are movable to the closed configuration at a zero position in which the first chute axis and the second chute axis are parallel to the center axis.

13. A windrow chute assembly for an agricultural vehicle, the windrow chute assembly comprising:
    a chute body comprising a plurality of movable chute sections, the plurality of movable chute sections comprising a first chute section and a second chute section,
    the first chute section having a first proximal end for receiving material from the agricultural vehicle, a first distal end opposite the first proximal end for discharging material from the agricultural vehicle, and a first chute axis extending between the first proximal end and the first distal end,
    the second chute section having a second proximal end for receiving material from the agricultural vehicle, a second distal end opposite the second proximal end for discharging material from the agricultural vehicle, and a second chute axis extending between the second proximal end and the second distal end,
    the first proximal end of the first chute section and the second proximal end of the second chute section defining a transverse axis therebetween, the first chute section being displaceable so as to define a first angle of displacement between the first chute axis and the transverse axis, and the second chute section being displaceable so as to define a second angle of displacement between the second chute axis and the transverse axis, and
    the first chute section and the second chute section being displaceable toward one another to a closed configuration, in which a sum of the first angle of displacement and the second angle of displacement is a maximum and displaceable away from one another to an open configuration in which the sum of the first angle of displacement and the second angle of displacement is a minimum;
    wherein the first chute section comprises a first bottom wall section and the second chute section has a second bottom wall section, the first bottom wall section and the second bottom wall section configured to convey material out of the first chute section and the second chute section respectively and the first chute section and the second chute section are movable to the closed configuration at at least one of a left and a right bias position in which the first angle of displacement is less than ninety degrees and the second angle of displacement greater than ninety degrees.

14. The windrow chute assembly of claim 13, wherein the first chute section and the second chute section are movable to the closed configuration at the right bias position in which the first angle of displacement is greater than ninety degrees and the second angle of displacement is less than ninety degrees.

15. The windrow chute assembly of claim 1, wherein the first chute section comprises a first bottom wall section and the second chute section has a second bottom wall section, the first bottom wall section and the second bottom wall section configured to convey material out of the first chute section and the second chute section, respectively.

16. The windrow chute assembly of claim 15, wherein the first chute section comprises a first sidewall and the second chute section comprises a second sidewall.

17. A windrow chute assembly for an agricultural vehicle, the windrow chute assembly comprising:
    a chute body comprising a plurality of movable chute sections, the plurality of movable chute sections comprising a first chute section and a second chute section,
    the first chute section having a first proximal end for receiving material from the agricultural vehicle, a first distal end opposite the first proximal end for discharging material from the agricultural vehicle, and a first chute axis extending between the first proximal end and the first distal end,
    the second chute section having a second proximal end for receiving material from the agricultural vehicle, a second distal end opposite the second proximal end for discharging material from the agricultural vehicle, and a second chute axis extending between the second proximal end and the second distal end,
    the first proximal end of the first chute section and the second proximal end of the second chute section defining a transverse axis therebetween, the first chute section being displaceable so as to define a first angle of displacement between the first chute axis and the transverse axis, and the second chute section being displaceable so as to define a second angle of displacement between the second chute axis and the transverse axis, and
    the first chute section and the second chute section being displaceable toward one another to a closed configuration, in which a sum of the first angle of displacement and the second angle of displacement is a maximum, and displaceable away from one another to an open configuration, in which the sum of the first angle of displacement and the second angle of displacement is a minimum;
    wherein the first chute section comprises a first bottom wall section and the second chute section has a second bottom wall section, the first bottom wall section and the second bottom wall section configured to convey material out of the first chute section and the second chute section, respectively and the first bottom wall section overlaps the second bottom wall section in the closed configuration.

18. A windrow chute assembly for an agricultural vehicle, the windrow chute assembly comprising:
    a chute body comprising a plurality of movable chute sections, the plurality of movable chute sections comprising a first chute section and a second chute section,
    the first chute section having a first proximal end for receiving material from the agricultural vehicle, a first distal end opposite the first proximal end for discharging material from the agricultural vehicle, and a first chute axis extending between the first proximal end and the first distal end,
    the second chute section having a second proximal end for receiving material from the agricultural vehicle, a second distal end opposite the second proximal end for discharging material from the agricultural vehicle, and a second chute axis extending between the second proximal end and the second distal end,
    the first proximal end of the first chute section and the second proximal end of the second chute section defining a transverse axis therebetween, the first chute section being displaceable so as to define a first angle of displacement between the first chute axis and the transverse axis, and the second chute section being displaceable so as to define a second angle of displacement between the second chute axis and the transverse axis, and the first chute section and the second chute section being displaceable toward one another to a closed configuration, in which a sum of the first angle of displacement and the second angle of displacement is a maximum, and displaceable away from one another to an open configuration, in which the sum of the first angle of displacement and the second angle of displacement is a minimum;

wherein the first chute section and the second chute section form an open channel in the closed configuration.

19. A windrow chute assembly for an agricultural vehicle, the windrow chute assembly comprising:

a chute body comprising a plurality of movable chute sections, the plurality of movable chute sections comprising a first chute section and a second chute section, the first chute section having a first proximal end for receiving material from the agricultural vehicle, a first distal end opposite the first proximal end for discharging material from the agricultural vehicle, and a first chute axis extending between the first proximal end and the first distal end, the second chute section having a second proximal end for receiving material from the agricultural vehicle, a second distal end opposite the second proximal end for discharging material from the agricultural vehicle, and a second chute axis extending between the second proximal end and the second distal end, the first proximal end of the first chute section and the second proximal end of the second chute section defining a transverse axis therebetween, the first chute section being displaceable so as to define a first angle of displacement between the first chute axis and the transverse axis, and the second chute section being displaceable so as to define a second angle of displacement between the second chute axis and the transverse axis, and the first chute section and the second chute section being displaceable toward one another to a closed configuration in which a sum of the first angle of displacement and the second angle of displacement is a maximum, and displaceable away from one another to an open configuration, in which the sum of the first angle of displacement and the second angle of displacement is a minimum;

wherein the first chute section and the second chute section form a closed conduit in the closed configuration.

* * * * *